Feb. 6, 1951 — R. S. WILLIAMS — 2,540,467
PILOT VALVE
Filed May 23, 1947
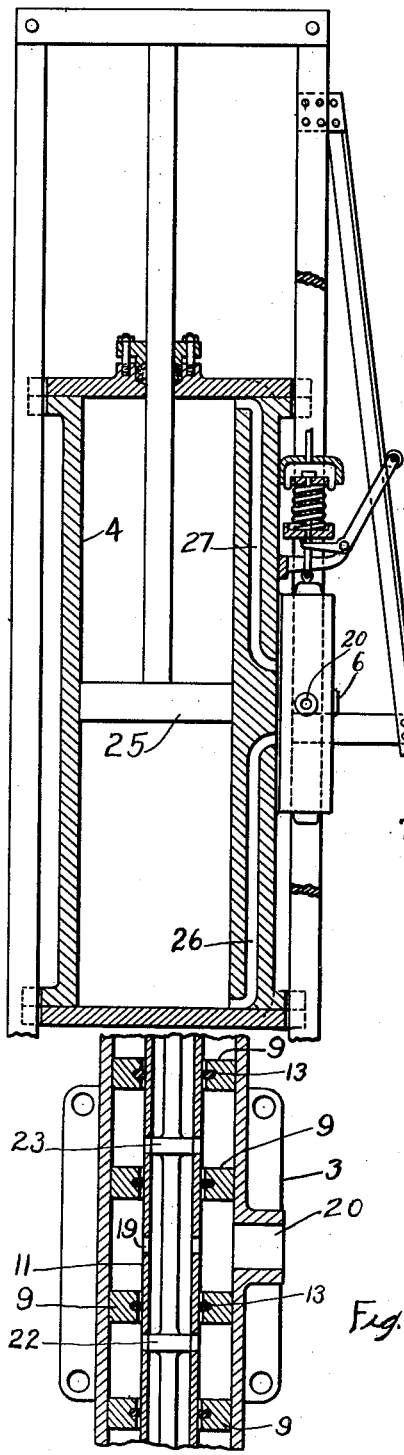
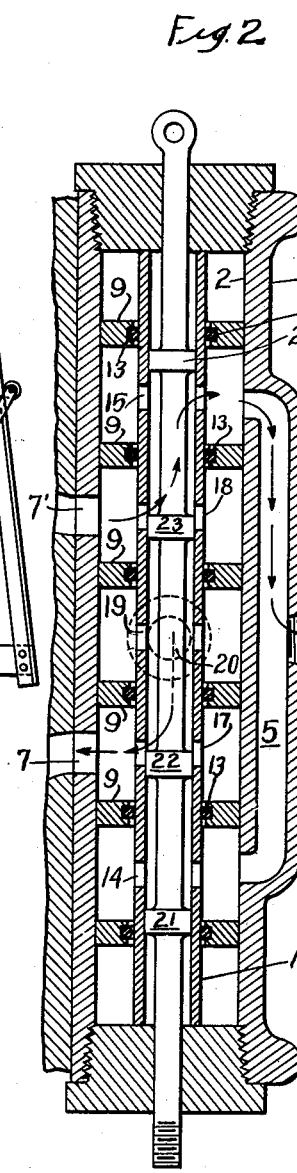
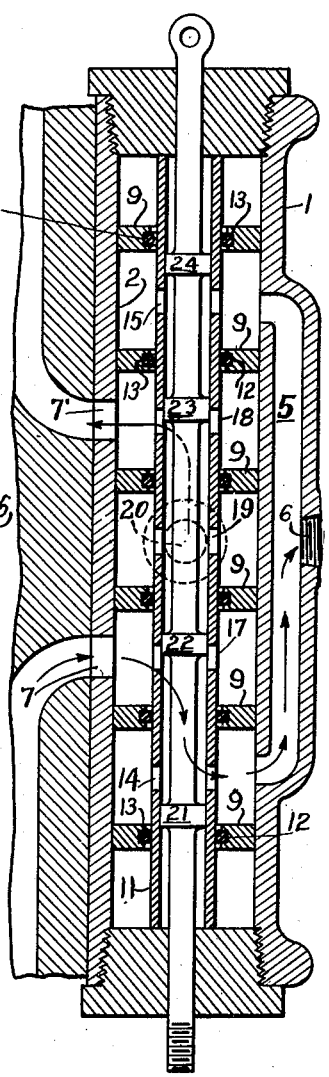
Ray S. Williams
INVENTOR.
BY Gerald B. Tjoflat
His Attorney Patented Feb. 6, 1951

2,540,467

UNITED STATES PATENT OFFICE 2,540,467

PILOT VALVE

Ray S. Williams, Orrville, Ohio, assignor, by mesne assignments, to Hagan Corporation, Pittsburgh, Pa., a corporation of Pennsylvania Application May 23, 1947, Serial No. 749,945

1 Claim. (Cl. 121—193)

This invention relates to valves and more particularly to multi-port pilot valves.

As heretofore constructed, pilot valves of the type of pilot valve to which my invention relates comprised a body having a specially machined sleeve which was pressed into the body and a valve which was slidably disposed within the sleeve. The sleeve was carefully machined and was formed with a plurality of annular shoulders on its outer surface which served as spacers or partitions defining the various ways of the valve.

The sleeves had to be manufactured with great accuracy and precision, the body had to be carefully prepared so that the sleeve could have a press fit in the body, and the valve stem had also to be carefully made in order that it would slide freely in the sleeve and still provide accurate control of the sleeve ports or ways.

Valves of this type were difficult to repair while in service, that is, they were difficult to repair on the spot, and if the sleeve was worn or corroded and had to be renewed, this could not be done without sending the valve to the manufacturer or to a shop suitably equipped to repair such valves.

An object of this invention is to provide a multi-port valve in which the body is provided with a straight bore for receiving a plurality of spaced rings, the valve sleeve is a straight tubular member which may be inserted axially of the bore through the openings in the rings, and the rings are provided with resilient oval sealing rings, for example, rings known in the trade as "O" rings, which serve to grip the sleeve and seal the space between adjacent rings.

A further object of the invention is to provide a valve of the type referred to above having a sleeve that may be easily mounted in place and readily removed for repair, replacement or inspection.

Other objects of the invention will, in part, be apparent, and will, in part, be obvious from the following description taken in conjunction with the accompanying drawings in which:

Figure 1 is a view in longitudinal section of a pilot valve arranged and constructed in accordance with an embodiment of the invention, the valve stem being illustrated in one of its control positions;

Fig. 2 is a view similar to Fig. 1 showing the valve stem in another of its control positions;

Fig. 3 is a partial view of the valve of Figs. 1 and 2 turned 90° whereby the inlet port of the valve is shown in full; and Fig. 4 is a more or less schematic view of a power cylinder provided with a pilot valve such as shown in Figs. 1, 2 and 3.

Throughout the drawings and the specification, like reference characters indicate like parts.

My improved pilot valve illustrated in the drawings comprises a body 1 having a cylindrical bore 2. The body may be provided with pads or lugs 3 whereby the valve may be secured to a power cylinder 4 for example, or to any other device having passages to be controlled by the valve. The body is provided with an exhaust duct 5, the opposite ends of which open into the bore of the valve body adjacent its respective ends and an exhaust port 6. The valve body is also formed with outlet ports 7 and 8, respectively.

The valve body as illustrated may be a casting which has its bore machined to the required finish and dimensions. Within the body are mounted a plurality of rings 9 which are spaced lengthwise of the body and located at predetermined points depending upon the arrangement and number of ports desired in the sleeve and valve body. Each ring 9 is so made that the rings may be pressed to the particular position required and be held by the pressure between the ring and the body. A valve sleeve 11 extends through rings 9 in spaced relation thereto but coaxial therewith.

The inner diameters of rings 9 are greater than the outside diameter of the valve sleeve 11. Each ring is formed with a groove 12 to accommodate a resilient sealing ring 13, such as an O ring for example. These rings are of rubber, either natural or synthetic. When the rings have been positioned within the body and placed in their proper locations, sleeve 11 is pushed through the rings and when in place, the O rings 13 grip the sleeves and seal the space formed between a pair of rings.

The particular valve illustrated is provided with two outlet or sending ports 7 and 7' and one exhaust port 6. The sleeve is provided with ports 14 and 15 adjacent its opposite ends that serve as exhaust ports, and intermediate ports 17 and 18 that serve alternately as sending ports and exhaust ports. The sleeve is provided also with an inlet port 19 that communicates with an inlet port 20 in the valve body.

The valve stem comprises a straight rod-like member having enlargements or valve lands 21, 22, 23 and 24 thereon. Valve lands 21 and 24 merely act as blocks or partitions for the opposite ends of the valve sleeve, whereas valve lands 22 and 23 control the ports 17 and 18.

When the valve stem is in neutral position as shown in Fig. 3, lands 22 and 23 register with and close ports 17 and 18. When the valve stem is moved downwardly to the position indicated in Fig. 1, valve land 22 blocks port 17 from the inlet port 20 in the valve body but land 23 puts port 18 in communication with it so that a pressure fluid such as compressed air or other motive fluid, such as water or oil, may flow in through port 22 into the annular space between the rings disposed between lands 22 and 23, and intermediate sleeve port 19, and thence upwardly in the sleeve and out of ports 18 and 7'. When the valve stem is in this position, the space between lands 21 and 22 is in communication with ports 7, 17 and 14. Thus, if fluid pressure is being delivered from the inlet port 20 to port 7', it will be apparent that flow in the reverse direction may take place to exhaust port 6.

When the valve stem is moved to the position shown in Fig. 2, inlet port 20 is in communication with ports 20, 19, 17 and 7, and port 7' is in communication for reverse flow with exhaust port 6 through ports 18 and 15.

The valve illustrated in the drawings is one which may be made with precision but at the same time may be readily assembled and adjusted for operation. It also is readily dismantled for repair or inspection.

An application of the valve is that illustrated in Fig. 4. In this view is illustrated a power cylinder having reciprocating piston 25 therein. The cylinder is provided with passageways 26 and 27 that serve the opposite ends of the cylinder. These passageways are arranged to connect with ports 7 and 7' of the valve body when the valve is mounted on the cylinder. When the valve is moved to the position shown in Fig. 1, pressure fluid is admitted to the upper face of the piston while the lower end of the cylinder is connected to exhaust through port 7, sleeve ports 17 and 14, the exhaust passage 5 and port 6.

When the valve is moved to the position shown in Fig. 2, the lower end of the cylinder is connected to the inlet port 22, whereas the upper end of the cylinder is connected to exhaust port 6 by way of sleeve ports 18 and 15, and exhaust passage 5.

Having thus described the invention, it will be apparent to those skilled in the art that various modifications and changes may be made in the arrangement or construction of the valve without departing either from the scope and spirit of the invention embodied therein. Therefore, what I claim as new and desire to secure by Letters Patent is:

A pilot valve comprising a body having a bore, a sleeve within the body, said sleeve being coaxial with but of smaller diameter than the bore, a plurality of rings disposed within and spaced from each other longitudinally of the bore of the body each of said rings having an annular groove on the inner face thereof and having a press fit with the bore of the body, said sleeve extending through said rings, and resilient ring gaskets mounted in said grooves on the inner faces of said rings to yieldingly grip said sleeve and provide sealed spaces between adjacent rings, said body having ports communicating with certain of the spaces between adjacent rings, said sleeve having ports communicating with the several spaces formed by pairs of said rings, and a valve slidable in said sleeve for selectively controlling communication between said body ports and said sleeve ports.

RAY S. WILLIAMS.

REFERENCES CITED

The following references are of record in the file of this patent:

UNITED STATES PATENTS

| Number | Name | Date |
| --- | --- | --- |
| 1,632,629 | Shannon | June 14, 1927 |
| 1,704,759 | Miller | Mar. 12, 1929 |
| 2,467,560 | Majneri | Apr. 19, 1949 |
| 2,469,921 | Hoge | May 10, 1949 |